United States Patent

Phelps et al.

[15] 3,646,931
[45] Mar. 7, 1972

[54] PORTABLE BATTERY-POWERED INSTRUMENT FOR VISUALIZING THE PERIPHERAL PULSE WAVEFORM AND PULSE RATE

[72] Inventors: Jerry A. Phelps, 6013 Innes Trace Road, Louisville, Ky. 40222; Donald J. Sass, 756 Forest Hills Drive S.W., Rochester, Minn. 55901

[22] Filed: Feb. 25, 1970

[21] Appl. No.: 14,143

[52] U.S. Cl. .................................. 128/2.05 T, 128/2.05 P
[51] Int. Cl. ............................................................ A61b 5/02
[58] Field of Search .................. 128/2.05 A, 2.05 C, 2.05 M, 128/2.05 P, 2.05 Q, 2.05 R, 2.05 S, 2.05 T, 2.05 V, 2.06 F, 2.06 R

[56] References Cited

UNITED STATES PATENTS

| | | | |
|---|---|---|---|
| 3,228,391 | 1/1966 | Fitter et al. | 128/2.05 T |
| 3,219,035 | 11/1965 | Pressman et al. | 128/2.05 A |
| 3,156,235 | 11/1964 | Jaeger | 128/2.05 R |
| 2,658,505 | 11/1953 | Sheer | 128/2.05 P |
| 3,154,067 | 10/1964 | Stenstrom et al. | 128/2.05 P |
| 3,229,686 | 1/1966 | Edmark, Jr. | 128/2.05 R |
| 3,412,729 | 11/1968 | Smith, Jr. | 128/2.05 R |

OTHER PUBLICATIONS

Molyneux et al.; " British Journal of Anesthesia," Vol. 27, 1955, pp. 261–263

Primary Examiner—William E. Kamm
Attorney—R. S. Sciascia and Arthur L. Branning

[57] ABSTRACT

A compact transistorized pulse detector comprising a strain gauge attached to a finger. The output signal is amplified an filtered to trigger a monostable multivibrator, which signal is then integrated to give a readout of the pulse rate on a meter. The pulse waveform is also visually displayed on a small, battery-powered CRT.

1 Claim, 2 Drawing Figures

INVENTORS
JERRY A. PHELPS
DONALD J. SASS
BY
ATTORNEY

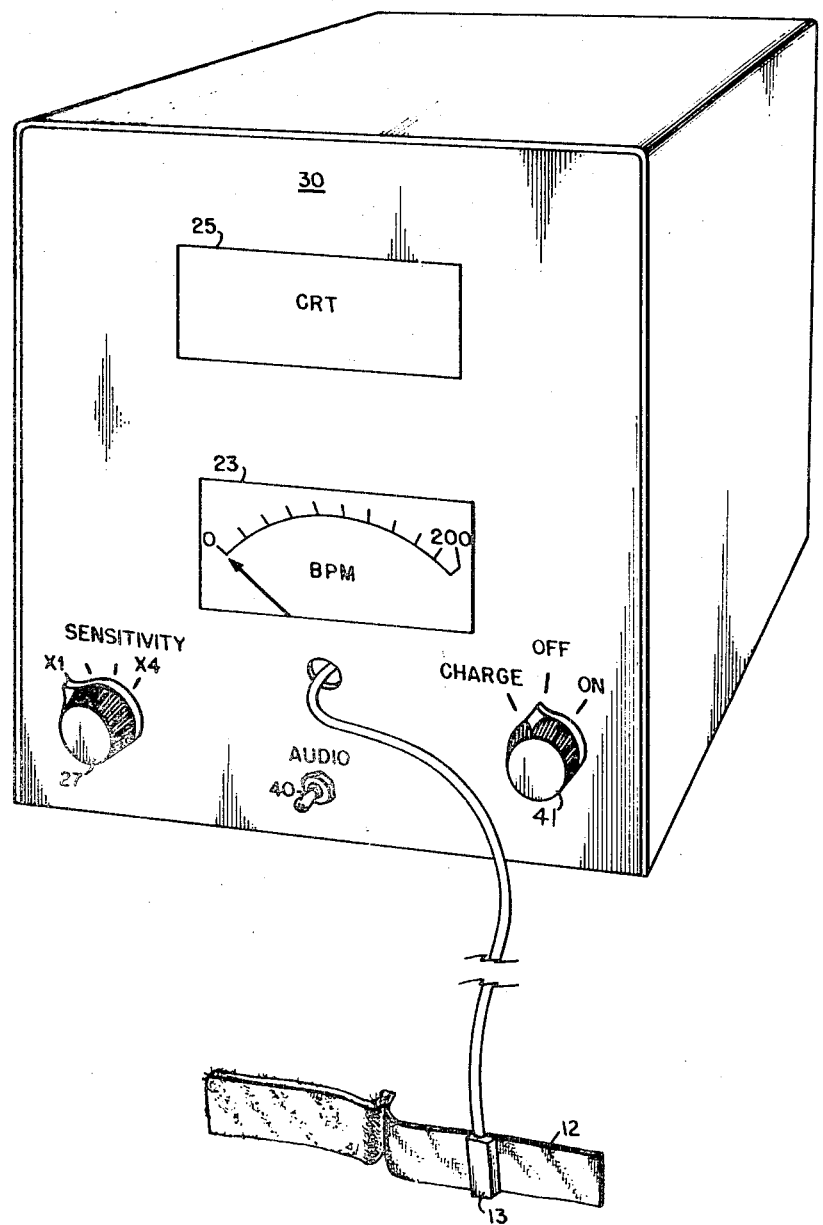

PORTABLE BATTERY-POWERED INSTRUMENT FOR VISUALIZING THE PERIPHERAL PULSE WAVEFORM AND PULSE RATE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to the field of electromechanical sensors and more particularly to the field of sensors for displaying the pulse waveform and detecting the pulse rate of the human body.

The general method employed in detecting the pulse rate of an individual involves the use of the hands and other sensory organs of the medical personnel attending the patient and in doing so, generally restrict the action which may be taken to aid the patient. It should be readily apparent that standard procedures are to a great extent dependent for their accuracy upon the skill and ability of the operator. Movement of the arm or body of the patient can interfere with a reading. Furthermore, the procedure is poorly adapted to monitoring the pulse rate of an individual where constantly repeated measurements are required as during an operation or when a patient is in critical condition.

In order to assist medical personnel, certain laboratory instruments have been adapted for gathering pulse rate data. The information received in the form of signals from the sensors is generally amplified and displayed or recorded for future use in establishing a medical history of the patient. It is highly desirable that sensors used in conjunction with the patient for detecting the pulse rate be of the type that can be left unattended after being attached to the body or body members. It has been found, however, that such sensors are generally quite cumbersome and sometimes bulky in their use and therefore do not lend themselves for portable or emergency use.

The electrocardiogram (ECG) commonly recorded during operations, does not give the anesthesiologist any indication of tissue blood flow other than the heart itself; in fact, peripheral circulation may be absent in the presence of a normal ECG.

Prior sensors attached to the patient's body to detect the pulse have generally been photocell detectors, microphones, or piezoelectric crystals. However, all three types are relatively bulky, making them practically useless in neonates. Commercial photocell detectors have also caused skin burns during prolonged use.

Commercial pulse monitors are available today, but they usually are used without a peripheral pulse waveform display such as an oscilloscope. These that do use an oscilloscope, however, usually utilize vacuum tubes, and are very bulky and cumbersome. Furthermore, those utilizing compact oscilloscopes and/or transistors require a source of AC power or have an extremely small cathode-ray tube and a short operating time before battery replacement is necessary. This precludes use of these instruments in remote areas, such as field hospitals, or for continuous use during anesthesia of long duration.

The use of high AC voltage in the vicinity of the operating room, such as when electrocautery equipment is employed, usually causes the CRT displayed waveform to be deflected off-screen because of the electrical interference. In presently used monitors, the display is interrupted during the time the electrocautery machine is utilized, plus an additional 10-20 seconds for the monitor to recover and become functional after the electrocautery is turned off. As the usual pattern is intermittent use of the cautery, present monitors cannot recover and may be interrupted for several minutes at a time.

SUMMARY OF THE INVENTION

A compact, battery-powered, solid-state instrument to display the waveform of the peripheral pulse and a real time readout of the pulse rate during surgery. The instrument uses a miniature semiconductor strain gauge attached to the finger or toe of a patient as the pulse detector. The pulse signal is amplified and any 60 Hz. interference filtered out before being displayed on a cathode-ray tube. The pulse signal is also passed through a 1 Hz. filter, and then triggers a level detector whose waveform is differentiated to trigger a monostable multivibrator, whose output is integrated and then displayed on a meter to give the pulse rate. An audible signal for each pulse can also be utilized. The instrument may be self-contained within a portable unit which also includes the batteries and the battery recharging circuit.

OBJECTS OF THE INVENTION

It is therefore an object of this invention to provide a miniature pulse detector.

Another object of this invention is to provide a direct display of the pulse rate.

A still further object of this invention is to provide a pulse monitor which is portable, lightweight and compact, and which does not require the services of highly skilled personnel during the operation thereof.

A further object of the present invention is to provide a completely dependable and reliable automatic pulse monitor.

A further object of the present invention is to provide a continuous display of the pulse waveform.

A further object of the present invention is to provide a pulse monitor that can operate from a DC source and be entirely self-contained, including the DC source recharging circuit.

A further object of the invention is to provide for an audible signal for each pulse signal.

A further object of the invention is to provide for both a visual display of the pulse waveform and a direct readout of the pulse rate in beats per minute simultaneously.

Yet another object of the present invention is to provide for a transistorized pulse monitor primarily utilizing integrated circuits.

A still further object of the present invention is to provide for a pulse monitor with a pulse detector capable for use on neonates.

DESCRIPTION OF THE DRAWINGS

Other objects and advantages of the present invention will become apparent from the following detailed description of the preferred embodiment thereof, when considered in conjunction with the accompanying drawings, wherein:

FIG. 2 is an embodiment in which the monitor is portable, and self-contained.

DESCRIPTION OF THE PREFERRED EMBODIMENT

Figure 1:
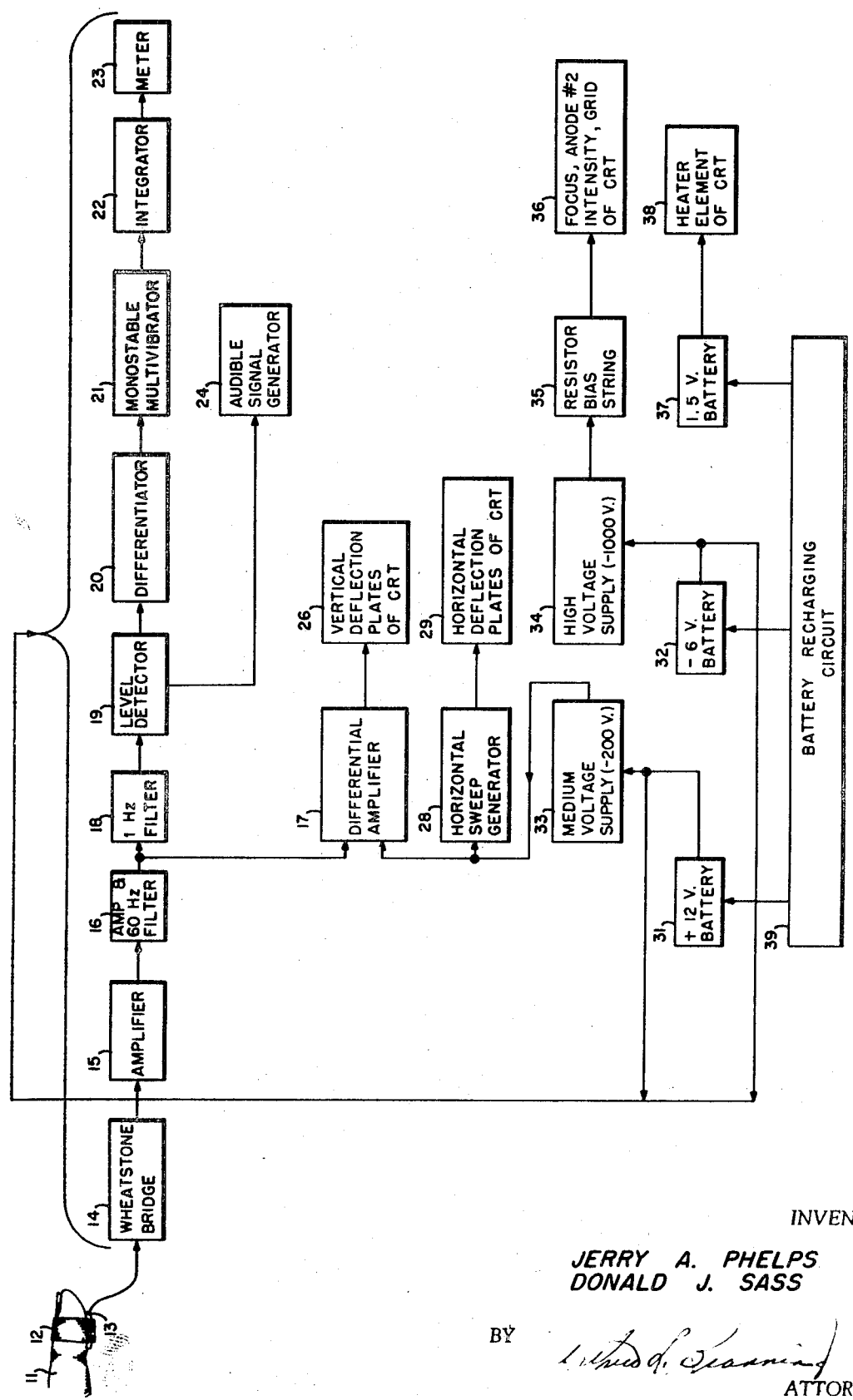
FIG. 1 is a block diagrammatic representation of a preferred embodiment of a pulse measuring and displaying device in accordance with the present invention during utilization by a patient.

The peripheral pulse waveform is an important measure of tissue blood flow, providing an indication of the integrity of cardiac and vascular systems. The pulse waveform detected in the capillary bed is dependent on both arterial inflow and venous outflow, but the amplitude of the pulse is primarily related to the arterial supply and therefore is a measure of tissue blood supply. The inherent elasticity of the vessels also plays a part in determining the shape of the pulse waveform, but in any one patient this will be constant and not a factor in the relative changes in amplitude monitored. The pulse wave detected at a digit can give a semiquantitative measure of tissue perfusion. A decrease in capillary blood pressure in the digits, although of smaller amplitude, is directly related to a reduction in digital volume, which is considered related to digital blood flow.

A decrease in the amplitude of the digital pulse waveform may be seen prior to any changes in the patient's vital signs, as the extremities, and particularly the digits with their rich arterial blood supply, are usually the first areas to undergo compensatory vasoconstriction.

The invention will now be described in detail with particular reference to FIG. 1, showing the diagrammatic representation of the preferred embodiment.

The apparatus of the present invention utilizes the technique of applying a sensor to the distal phalanx of the patient's finger 11. The detector is a miniature semiconductor strain gauge 13 which is easily applied to the distal phalanx of a finger or toe, employing a Velcro cuff 12. It is sufficiently small (10 mm. × 5 mm.) to be used on newborns as well as adults. The pulse is detected by the strain gauge 13, which forms one arm of the Wheatstone bridge 14.

The output of strain gauge 13 is an electrical signal that varies in amplitude in proportion to the pressure acting through an artery wall. Since the heart beats, the flow of blood through the arteries is necessarily pulsating. Therefore, the electrical signal picked up has a substantially pulselike waveform.

Due to unbalance in the bridge 14 caused by the pulse, a signal is transferred to amplifier 15 to be amplified. The output of amplifier 15 passes through amplifier and filter 16 which further amplifies the signal and removes 60 Hz. interference present. At this point part of the signal is fed to a differential amplifier 17 using bipolar transistors, to provide enough voltage to drive the vertical deflection plates 26 of the cathode-ray tube (CRT) 25 in a push-pull manner. The pulse is thus displayed on a cathode-ray tube such as the Sylvania 3BGP7 which has a 1¼×3-inch face size and is specially developed for battery-powered oscilloscopes using only 6 percent of the power required of conventional cathode-ray tubes for the heater element.

The vertical sensitivity adjustment 27, which is part of amplifier and filter 16, may be adjusted in fixed increments so that the relative changes in pulse amplitude can be quickly measured following administration of an anesthetic or drug, or after an operative maneuver.

A horizontal sweep generator 28 provides a saw tooth waveform which drives the horizontal deflection plates 29 of the CRT 25, resulting in a free running sweep.

If a permanent record is required, an X-Y recorder or other pen-type recording device may be connected to the output of amplifier and 60 Hz. filter 16 and used instead of, or in conjunction with the cathode-ray oscilloscope 25.

The pulse signal, besides being displayed on CRT 25 is further processed to measure the pulse rate. The signal from amplifier and filter 16 is fed to a low-pass (1 Hz.) filter 18 to remove the dicrotic notch caused by aortic valvular closure, which could cause a falsely high pulse reading. The signal then passes through level detector 19, to remove background noise and provide a step change in voltage, whose output signal is differentiated by differentiator 20 to provide a sharp negative going spike.

The sharply peaked signal from differentiator 20, corresponding to each pulse, is fed to monostable multivibrator 21 which switches to its unstable condition when the amplitude of the input signal exceeds a predetermined trigger level and returns to its stable condition after a short period of time. The output of monostable multivibrator 21, in the form of a rectangular pulse, is fed to the input of integrator (analog frequency counter) 22, which provides a current directly proportional to the pulse rate and is read out on meter 23, which may be a 3-inch, 0 to 1 milliammeter calibrated in beats per minute. The meter scale is calibrated from 0 to 200 beats per minute (bpm), the reading being accurate to ±4 bpm.

If desired, an audible signal which sounds for each pulse from level detector 19 may be derived from audible signal generator 24, by operating switch 40.

The electronic circuitry in the apparatus described above is entirely solid-state (with the exception of the CRT 25) and battery-operated, and may be contained in one compact unit 30, as shown in FIG. 2. Also included in the unit are the batteries that power the circuits. A 12-volt battery 31 and a 6-volt battery 32 can provide the positive and negative supply, respectively, for the integrated circuit operational amplifiers. The Wheatstone bridge 14 is powered by the 6-volt battery 32 and the monostable multivibrator 21 is powered by the 12-volt battery 31 as is the audible signal generator 24.

The medium voltage supply 33, which produces −200 volts for the horizontal and vertical deflection circuits, is generated by a Hartley-type oscillator powered by the 12-volt battery 31. The high voltage supply 34 of −1,000 volts is provided by a blocking oscillator powered by the 6-volt battery 32. This provides the accelerating beam voltage, and by a resistor bias string 35, intermediate voltages for the focus,anode No. 2, grid, and intensity 36 of the CRT 25. A 1.5-volt battery 37 directly powers the heater element 38 of the CRT 25.

A battery recharging circuit 39, contained in the unit, steps down, rectifies, and limits 120-volt AC to the proper DC voltages and currents for the three nickel cadmium batteries. A Chicago-Stancor P–8363 may be used for the transformer in this circuit. A three-pole, three-position function switch 41 is used to select the battery recharge, off, or on function.

Utilizing this monitor, the systolic blood pressure may be determined when the pulse cannot be easily palpated and when the Korotkoff sounds are difficult to hear. A blood pressure cuff is applied to the same extremity as the pulse monitor and the blood pressure recorded when the pulse is first detected by the monitor. This technique is helpful in infants where the oscillimetric method of determining the systolic pressure is unsatisfactory and the flush method impractical during anesthesia.

Abnormal heartbeats or pulse waveforms may be detected with this monitor, i.e., premature ventricular contractions with a compensatory pause, pulsus alternans, etc., may be detected. Tissue perfusion during closed chest cardiac massage or cardiac catheterization may also be monitored.

The complete monitor described above can thus provide anesthesiologists with a visual display of the peripheral pulse waveform and pulse rate during surgical operations. It can be easily mounted on an anesthesia machine or intravenous pole in the operating room, and operates from self-contained rechargeable batteries. It is compact, lightweight, entirely solid-state, operates for a long period of time, has a short warmup period and may be used in remote areas. It is a valuable adjunct to the evaluation of the patient's cardiovascular status during anesthesia as well as providing a continuous readout of the pulse rate and freeing the hands of the anesthesiologist for other duties.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Apparatus for detecting the pulse of an individual comprising:
   a strain gauge for producing electrical signals representative of the pulse waveform, said strain gauge adapted to be attached to a digit of said individual;
   circuitry coupled to said strain gauge for modifying said signals;
   a differentiator coupled to said circuitry for differentiating said modified signals to provide spike signals;
   a monostable multivibrator coupled to said differentiator for producing a rectangular pulse for each spike signal;
   an integrator coupled to said monostable multivibrator for integrating said rectangular pulses;
   a first display means coupled to said integrator for indicating the pulse of said individual;

said circuitry comprising a Wheatstone bridge circuit, wherein said strain gauge is a miniature semiconductor and forms one arm of said Wheatstone bridge circuit whereby said bridge circuit transmits a pulse signal upon detection of a pulse by said strain gauge;

amplifier means coupled to said bridge circuit for amplifying said pulse signal;

filter means coupled to said amplifier for removing 60 Hz. interference;

a 1 Hz. low-pass filter coupled to said filter means for removing the dicrotic notch from the pulse waveform;

a level detector coupled to said low-pass filter for providing a step change in voltage for each pulse signal, said level detector also coupled to said differentiator;

an audible signal generator coupled to said level detector for audibly indicating each pulse signal detected by said strain gauge;

said first display means comprising a milliammeter; and a second display means comprising a cathode-ray tube having a very small face size.

* * * * *